INVENTOR
Karl Heinz FEISTEL by Krafft & Wells
ATTORNEYS

United States Patent Office 3,443,250
Patented May 6, 1969

3,443,250
SYSTEM OF SERIES-CONNECTED BAND-PASS FILTER NETWORKS
Karl Heinz Feistel, Eningen unter Achalm, Germany, assignor to Wandel u. Goltermann, Reutlingen, Germany
Filed May 12, 1965, Ser. No. 455,162
Claims priority, application Germany, May 26, 1964,
W 36,868
Int. Cl. H01h 7/10; H01p 5/12; H03m 7/10
U.S. Cl. 333—76                7 Claims

ABSTRACT OF THE DISCLOSURE

A reactance band-pass system which has several band-pass ranges, all of which have the same basic band-pass attenuation, and which is connected between a certain source resistance $R_s$ and a certain load resistance $R_L$. Another novel feature is a frequency outlet with two outputs, at output 1 of which the signals of the band-pass range appear and at output 2 of which the remaining signals appear. In this additional feature there is in each band-pass range an additional basic attenuation of 3 db. At output 2 this additional attenuation does not appear in the band-stop ranges.

---

This invention relates to a band-pass filter network comprising several reactance band-pass filters.

Filters of this kind are needed for measurements on broad-message transmitting systems if particular channels which contain measurable signals are to be separated from the remaining channels which contain strong disturbing signals or messages (with a difference for example of 80 db). In a normal measurement with a peak-responsive meter, the latter would be dominated by the disturbing signals. The reactance band-pass of this invention serves as a preselector for an after-connected peak-responsive meter with which measurements are to be made in several band-pass ranges. In a further application of this invention simultaneous measurements can be made by connecting to output 1 (FIG. 7) the peak-responsive meter. The message channels will then appear at output 2.

In communication equipment, series-connected band-pass filter networks having different mid-frequencies are required. FIGURE 1 shows a known system of such band-pass filters BP–1 through BP–n which may be thought of as component matrices derived from the four-terminal impedance matrix BP shown at the right of FIGURE 1. In the special case of reactance band-pass filters, each of the component four-terminal network BP–1, BP–2, etc. can be computed individually as a band-pass filter provided its band-stop input resistance, as seen from the generator and the load, is low and provided its mid-frequency is sufficiently spaced from the mid-frequencies of the other filters. The band-pass characteristic of the separate filters is then not different from that of the four-terminal network when measured between the resistances $R_s$ and $R_L$ in FIGURE 1 at the right. The attenuation characteristic of the combination of filters is shown in FIGURE 2. The different basic attenuation values at the mid-frequencies $f_{m1}, f_{m2}$ etc. through $f_{mn}$, as indicated by the lowest points of the attenuation characteristic are located on different levels, which is a highly unsatisfactory result of this network arrangement, but is unavoidable because of different bandwidths or coil Q figures. As the filters are series-connected, it is impossible to compensate the different basic-attenuation levels with the aid of attenuators in the inputs or outputs of the filters.

In other known circuit configurations, only the inputs of the band-pass filters are connected in series with the aid of wave traps and acceptor circuits while their outputs are switched as required for the frequency range desired. Here the disadvantage is that such wave traps and acceptor circuits do not sharply separate the band-pass range from the bandstop range. Moreover, the necessary switching of the filter outputs constitutes an additional disturbance.

A feature of the present invention is the elimination of the said unsatisfactory results and of the said disadvantage and inconvenience by providing a transformer having a resistor parallel-connected to its primary winding in the output or the input of the band-pass filters and by adjusting the transformer ratios and the associated resistances so that the same amount of basic attenuation is obtained in all filters including these equalizing networks and each filter is matched to the internal resistance of the generator feeding the series combination of filters. In an embodiment according to this invention, the basic attenuation values of all serially connected band-pass filters are made equal and the pass-band range is sharply delimited against the stop-band range, as evidence by the steep edge of the filter characteristic.

It is therefore an object of the present invention to provide a combination of series-connected band-pass filters of substantially equal basic attenuation.

It is a further object of this invention to provide a series combination of band-pass filters having a transformer in the input or output of each filter and a resistor in parallel to the primary winding, the transformer ratio and the resistor rating being selected so that each of the said filters has the same value of basic attenuation.

Another object of the invention is to provide a series combination of band-pass filters with a parallel combination of transformer and resistor in which each band-pass filter is impedance-matched to its feeding generator.

It is a further object of this invention to provide, in the input to the said combination, a resistance in series with an equal to the generator internal resistance so that the energy falling into the stop-band ranges of the said filters is available without basic attenuation across this series resistance.

The aforementioned objects and still other objects of this invention will become immediately apparent to those skilled in the art when considered in view of the following disclosure of the specific preferred embodiments thereof, which are provided by way of example and not by way of limitation, wherein.

Figure 1:
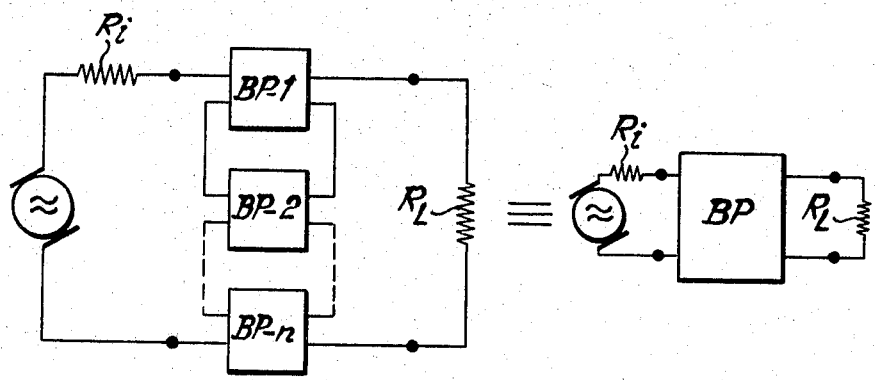
FIGURE 1 is a series combination of band-pass filters according to prior art.
Figure 2:
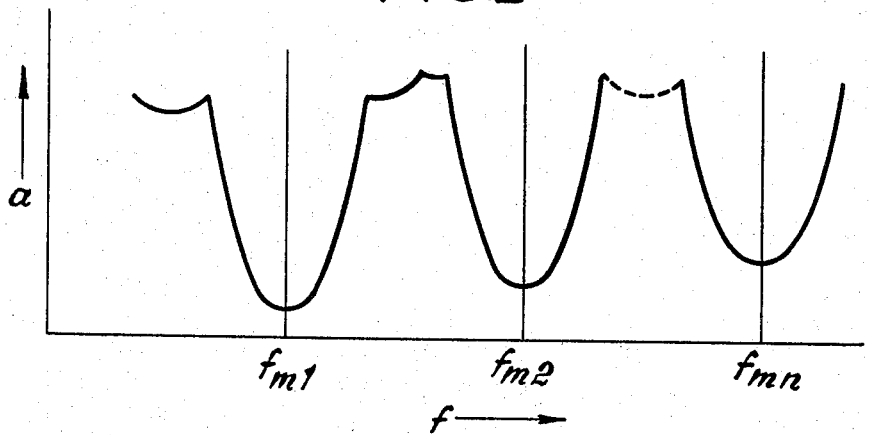
FIGURE 2 is the frequency-response characteristic of the combination of FIGURE 1.
Figure 3:
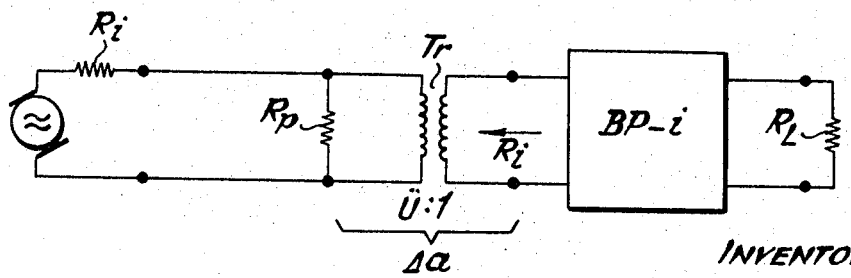
FIGURE 3 is a diagram of a preferred embodiment of the invention.

FIGURE 3 shows a band-pass filter BP–$i$ that will be used to explain the principle of the invention. The basic attenuation is adjusted with the aid of transformer $Tr$ and resistor $R_{1i}$ parallel-connected to the transformer primary. $R_p$ and the transformer ratio N are so dimensioned as to match the band-pass filter to the generator internal resistance $R_s$, at the same time providing the desired additional attenuation $\Delta a$. The relations so obtained are:

$$N_i = e^{-\Delta a_i} \text{ and } R_{p_i} = \frac{R_i}{e^{2\Delta a_i} - 1}$$

For the band-pass filter having the highest basic attenuation, $\Delta a = 0$, $N=1$ and $R_p = \infty$.

Figure 4:
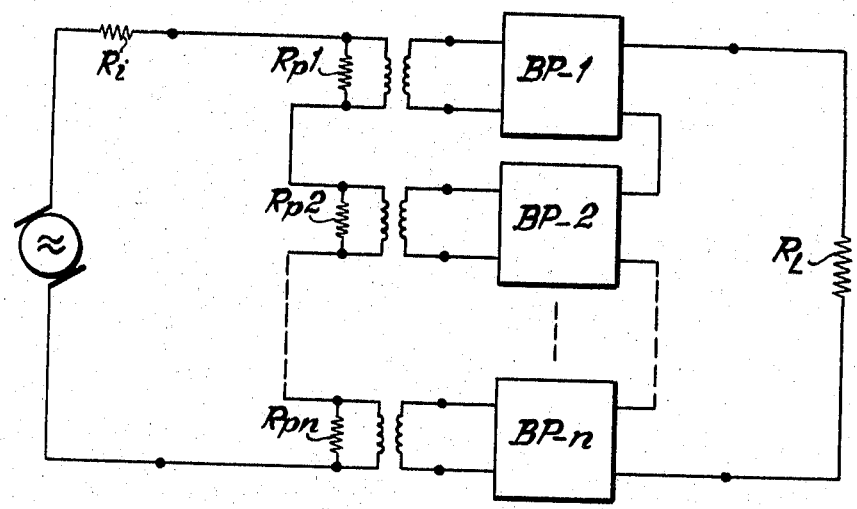
FIGURE 4 is a diagram of a second preferred embodiment of the invention.

FIGURE 4 shows a series combination of band-pass filters of FIGURE 3. This combination is not disturbed by the compensation of the basic attenuation in accordance with the invention if the transformers have a small copper resistance and small dispersion (scattering resistance) because the input resistance of all filters BP–$i$ in the shut-off range form a short circuit.

Figure 5:
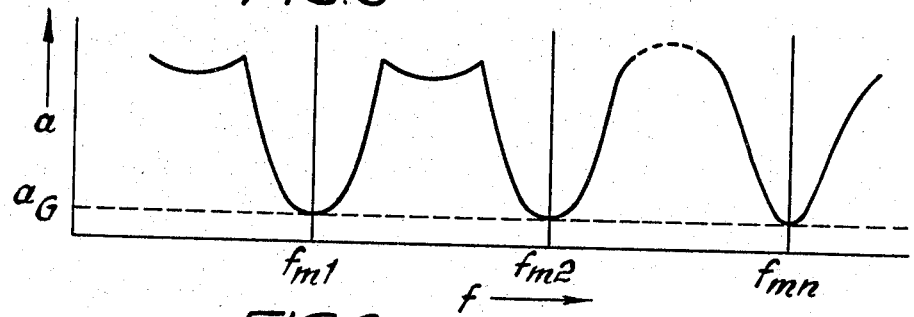
FIGURE 5 is the frequency-response characteristic of the embodiment of FIGURE 4.

FIGURE 5 shows the frequency response characteristic of the embodiment of FIGURE 4 and specifically the equal basic attenuation at each band-pass filter mid-frequency, indicated by the horizontal dashed line.

The described adjustment of the basic attenuation with the aid of a transformer and a resistor can also be provided in the output of each band-pass filter. The question of whether the input or the output end should be used is best decided by using that end in awhich most of the band-pass filters have a shunt coil as the last component. In the case where a single band-pass (BP–1, BP–2 or BP–3) begins on the input side with a shunt coil, it is advantageous that such a shunt coil be in the form of a transformer so that no additional transformer will be necessary.

Figure 6:
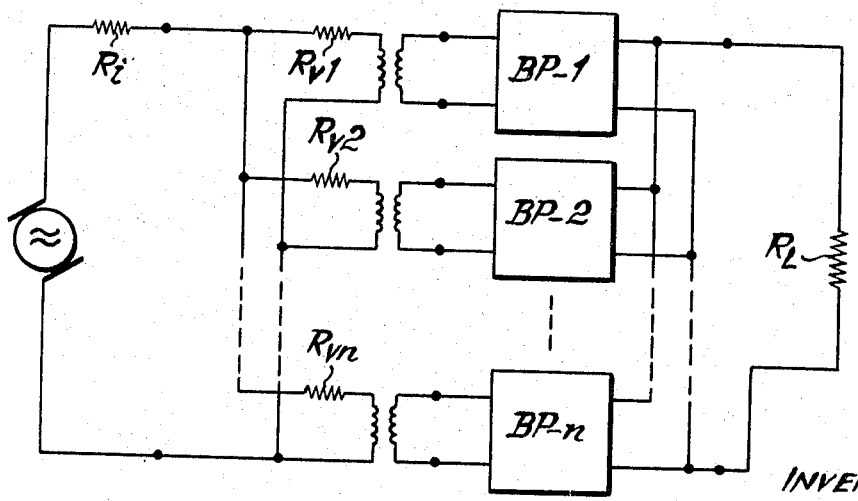
FIGURE 6 is a diagram of a third preferred embodiment of the invention.

FIGURE 6 shows an embodiment that is a modification of FIG. 4 inasmuch as the band-pass filters with their respective transformer primaries form a parallel instead of a series combination when they have high impedances in the band-stop ranges. There are also cases where the input is of the high-impedance type, as in FIGURE 6, and the output of the low-impedance type, as in FIGURE 4, or vice versa.

Figure 7:
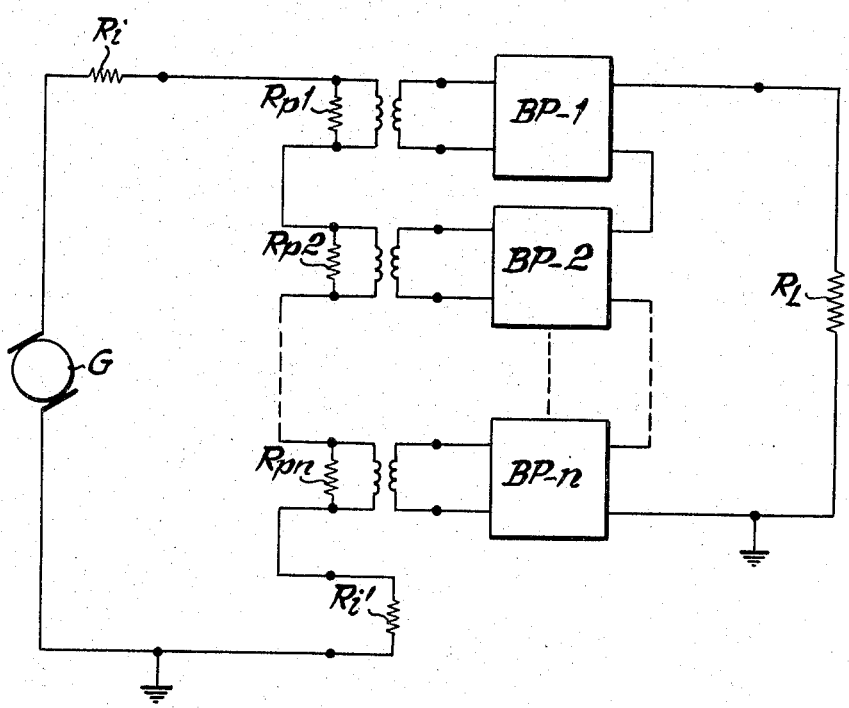
FIGURE 7 is a diagram of a fourth preferred embodiment of the invention.

FIGURE 7 indicates an embodiment of a directional filter where the invention is particularly useful. A combination of this type can well be connected to a carrier-system transmission line, represented by the generator G with the internal resistance $R_s$ in FIGURE 7. In this case, the various signal sidebands are in the band-stop ranges of the individual band-pass filter BP–1 through BP–$n$ whereas the frequency bands corresponding to the band-pass ranges of BP–1 to BP–$n$ are utilized e.g., for continuous monitoring of the transmission path. Here the following relations apply:

$$N_i = \sqrt{2} e^{-\Delta a_i} \text{ and } R_{p_i} = \frac{2R_i}{e^{2\Delta a_i} - 1}$$

For the band-pass filter having the highest basic attenuations, $\Delta a = 0$, $N = \sqrt{2}$, and $R_p = \infty$.

Figure 8:
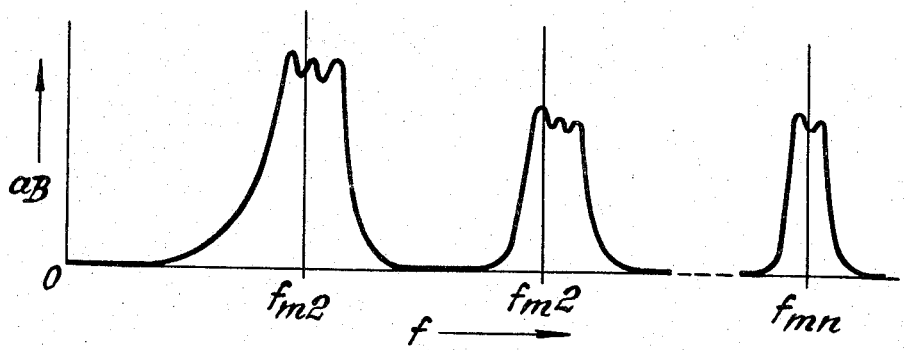
FIGURE 8 is the frequency response characteristic between the input and No. 2 output of the embodiment in FIGURE 7.

The embodiment of FIGURE 7—between input and No. 1 output is identical with that of FIGURE 4; that is, it has the same freqency-response characteristic; however, now the minimum mid-band basic attenuation is 0.35 neper. The shut-off resistor $R'_s$ which is to be connected to output 2, together with the source resistance $R_s$, constitute for the output 1 a voltage divider which causes an additional attenuation of 3 db (=0.35 Neper). The frequency response characteristic between the input and No. 2 output is indicated in FIGURE 8. The signal energy falling into the band-stop ranges of the band-pass filter is available across the resistor $R'_s$ without attenuation; this resistor thus shuts off the grounded No. 2 output. This energy is thus not reflected as in the embodiment of FIGURE 4. The directional filter combination of FIGURE 7 thus presents the additional advantages of a low reflection coefficient in the band-stop ranges which is of particular importance when the directional filter network is connected to a transmission line; and here again the band-stop range is sharply separated from the band-pass range.

What is claimed is:

1. A band-pass filter arrangement having several passbands, each pass-band having the same intrinsic attenuation producing the same insertion loss and having a different center frequency, each pass-band being separated from the others by stop-bands, the arrangement comprising several four-pole filter units each having two input ports, the inputs being connected to one another and to a signal generator having an output impedance, the outputs of said four-poles being connected to one another and to a matched terminal load resistor, each four-pole comprising a reactance band-pass filter having one of the pass-band center frequencies but a different insertion loss, one side of said reactance band-pass filter constituting one part of said four-pole, a transformer comprising a primary and a secondary coil, the first coil of said transformer being connected to the other side of said reactance band-pass filter, a correcting resistor connected to said second coil of said transformer in the opposite manner to the connection of the inputs of said four-poles, namely in series when in parallel and in parallel when in series, said correcting resistor and said second coil forming together the other part of said four-pole, said transformer turns ratio and said correcting resistor having such values that the insertion losses of all four-poles are equal, each reactance band-pass filter being matched to the output impedance of said signal generator.

2. A band-pass filter arrangement having several passbands, each pass-band having the same insertion loss and a different center frequency, each pass-band being separated from the others by stop-bands, the arrangement comprising several four-pole filter units each having two input ports, the input being connected to one another and to a signal generator having an output impedance, the outputs of said four-poles being connected in series and to a terminal load resistor, each four-pole comprising a reactance band-pass filter having one of the pass-band center frequencies but a different insertion loss, the output of said reactance band-pass filter constituting the output of said four-pole and being matched to said terminal resistor, a transformer comprising a primary and a secondary coil, the secondary coil being connected to the input of said reactance band-pass filter, a correcting resistor connected in parallel to said primary coil, the correcting resistor and the primary coil forming together the input of said four-pole, the turns ratio of said transformer and the correcting resistor having such values that the insertion losses of all four-poles are equal, and each reactance band-pass filter being matched to the impedance of said signal generator.

3. A band-pass filter arrangement having several passbands each of which has the same insertion loss and a different center frequency, each pass-band being separated from the others by stop-bands, the arrangement comprising several two-port four-poles, the inputs of said four-poles being connected in parallel and to a signal generator having an output impedance while the outputs of said four-poles are connected in parallel and to a terminal load resistor, each four-pole comprising a reactance band-pass filter having the center frequency of one of said pass-bands but a different insertion loss, the output of said reactance band-pass constituting the output of said four-pole and being matched to the terminal resistor, a transformer comprising a primary and a secondary coil, said secondary coil being connected to the input of said reactance band-pass filter, a correcting resistor connected in series to the primary coil and forming with the latter the input of said four-pole, the transformer turns ratio and said correcting resistor having such values that the insertion losses of all four-poles are equal, and each reactance band-pass filter being matched to the output impedance of said signal generator.

4. A band-pass filter arrangement having several passbands each having the same insertion loss and a different center frequency, each pass-band being separated from the others by stop-bands, the arrangement comprising several two-port four-poles, the inputs of said four-poles being connected in series and to a signal generator having an output impedance, the outputs of which are connected in series and to a terminal load resistor, each four-pole comprising a reactance band-pass filter having the center frequency of one of the pass-bands but a different insertion loss, the input of said reactance band-pass filter constituting the input of said four-pole and being matched to the output resistance of said signal generator, a transformer comprising a primary coil and a secondary coil, said primary coil being connected to the output of said reactance band-pass filter, a correcting resistor connected in parallel to said secondary coil, the correcting resistor and the secondary coil forming together the output of said four-pole, the transformer turns ratio and said correcting resistor having such values that the insertion losses of all four-poles are equal, and each reactance band-pass filter being matched to the terminal resistor.

5. A band-pass filter arrangement having several pass-bands each having the same insertion loss and a different center frequency, each pass-band being separated from the others by stop-bands, the arrangement comprising several two-port four-poles, the inputs of said four-poles being connected in parallel and to a signal generator having an output impedance while the outputs are connected in parallel and to a terminal load resistor, each four-pole comprising a reactance band-pass filter having the center frequency of one of the pass-bands but a different insertion loss, the input of said reactance band-pass filter constituting the input of said four-pole and being matched to said output resistance of said signal generator, a transformer comprising a primary coil and a secondary coil, said primary coil being connected to the output of said reactance band-pass filter, a correcting resistor connected in series to said secondary coil, the correcting resistor and the secondary coil forming together the output of said four-pole, the transformer turns ratio and the correcting resistor having such values that the insertion losses of all four-poles are equal, and each reactance band-pass filter being matched to the terminal resistor.

6. The arrangement of claim 1, further including two connections at a second output adapted to be connected to a device having a matched input impedance equal to the output impedance of said signal generator, said connections being connected to the inputs of said four-poles in a manner corresponding to that of the connection of the inputs of said four-poles, and to said signal generator having the said output impedance, the device having available the usable energy of the stop-bands of said band-pass filters without insertion loss, while half of the falling in energy of the pass-bands of said band-pass filters is available in said terminal resistor.

7. The arrangement of claim 1, in which the first coil of said two coils of said transformer also constitutes a transverse coil in said reactance band-pass filter on the second side thereof.

References Cited

UNITED STATES PATENTS

| | | | |
|---|---|---|---|
| 2,024,900 | 12/1935 | Wiener | 333—70 |
| 2,932,804 | 4/1960 | Mattson | 333—75 |
| 2,768,351 | 10/1956 | Scholten et al. | 333—8 |
| 2,076,248 | 4/1937 | Norton | 333—8 |
| 1,957,519 | 5/1934 | Aiken | 333—8 |
| 1,937,796 | 12/1933 | Smith | 333—8 |
| 3,054,968 | 9/1962 | Harrison | 333—72 |
| 1,916,187 | 6/1933 | Read | 333—8 |

HERMAN K. SAALBACH, *Primary Examiner.*

C. BAROFF, *Assistant Primary.*

U.S. Cl. X.R.

333—8, 70